US012767166B2

(12) United States Patent
Bang et al.

(10) Patent No.: US 12,767,166 B2
(45) Date of Patent: Oct. 20, 2026

(54) APPARATUS AND METHOD FOR CONTROLLING AUTONOMOUS DRIVING

(71) Applicants: HYUNDAI MOTOR COMPANY, Seoul (KR); KIA CORPORATION, Seoul (KR)

(72) Inventors: Kyung Joo Bang, Hwaseong-si (KR); Jeong Ki Hong, Seongnam-si (KR); Jae Woong Hwang, Seoul (KR); Dong Hyuk Kim, Hanam-si (KR); Il Hwan Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 147 days.

(21) Appl. No.: 18/766,194

(22) Filed: Jul. 8, 2024

(65) Prior Publication Data

US 2025/0187625 A1 Jun. 12, 2025

(30) Foreign Application Priority Data

Dec. 11, 2023 (KR) ........................ 10-2023-0179093

(51) Int. Cl.
*B60W 60/00* (2020.01)
*B60W 40/107* (2012.01)

(52) U.S. Cl.
CPC ......... *B60W 60/00* (2020.02); *B60W 2555/00* (2020.02); *B60W 2720/125* (2013.01)

(58) Field of Classification Search
CPC ............. B60W 60/00; B60W 2555/00; B60W 2720/125; G05D 1/0061; G05D 1/0088;
(Continued)

(56) References Cited

U.S. PATENT DOCUMENTS 5,454,442 A * 10/1995 Labuhn .............. B60K 31/0008 340/904
5,647,647 A * 7/1997 Kato ......................... B60T 8/00 303/177

(Continued)

FOREIGN PATENT DOCUMENTS

KR 20170119534 A 10/2017
KR 102353346 B1 1/2022

OTHER PUBLICATIONS

Chen Lv, et el., Regenerative Braking Control Algorithm for an Electrified Vehicle Equipped with a By-Wire Brake System, SAE International, Apr. 1, 2024, DOI:10.4271/2014-01-1791, 9pp.

*Primary Examiner* — Manglesh M Patel
(74) *Attorney, Agent, or Firm* — Lempia Summerfield Katz LLC

(57) ABSTRACT

A vehicle control apparatus may include a sensor device, an acceleration device, a deceleration device, a memory, and a control device. The vehicle control apparatus may set an initial state of the host vehicle to an acceleration device operating state, may generate a required acceleration based on driving situation information and a host vehicle acceleration obtained based on the sensor device, and may identify a control command value that corresponds to the required acceleration and is to be delivered to at least one of the acceleration device or the deceleration device. The vehicle control apparatus may control at least one of the acceleration device or the deceleration device based on control information of a section including the control command value.

20 Claims, 7 Drawing Sheets

(58) Field of Classification Search
CPC .... G05D 1/021; G05D 1/0214; G05D 1/0221; G05D 1/0223; B60K 28/00–165
See application file for complete search history.

(56) References Cited

U.S. PATENT DOCUMENTS

| | | | | | |
|---|---|---|---|---|---|
| 6,167,343 | A * | 12/2000 | Bauerle | F02D 41/10 | 123/396 |
| 6,273,204 | B1 * | 8/2001 | Winner | B60W 30/16 | 180/170 |
| 6,295,500 | B1 * | 9/2001 | Cullen | B60W 20/11 | 180/170 |
| 6,985,805 | B2 * | 1/2006 | Sudou | B60W 30/18145 | 180/170 |
| 8,504,275 | B2 * | 8/2013 | Schwindt | B60W 30/16 | 701/96 |
| 10,479,361 | B2 | 11/2019 | Huh | | |
| 2004/0088061 | A1 * | 5/2004 | Nakashima | G05B 19/40 | 700/304 |
| 2008/0288150 | A1 * | 11/2008 | Isogai | B60T 7/22 | 701/70 |
| 2009/0118958 | A1 * | 5/2009 | Abe | B60W 40/107 | 701/70 |
| 2010/0121549 | A1 * | 5/2010 | Fukuda | B60W 30/188 | 701/93 |
| 2016/0137197 | A1 * | 5/2016 | Hayakawa | B60W 30/18154 | 701/70 |
| 2018/0215385 | A1 | 8/2018 | Huh et al. | | |
| 2018/0237014 | A1 * | 8/2018 | Nasu | B60W 10/02 | |
| 2021/0139039 | A1 * | 5/2021 | Joo | B60W 40/105 | |
| 2021/0276580 | A1 * | 9/2021 | Tobe | B60W 50/085 | |
| 2022/0281451 | A1 * | 9/2022 | Bani Milhim | B60W 30/16 | |
| 2025/0249903 | A1 * | 8/2025 | Kumazaki | B60W 50/14 | |

* cited by examiner

APPARATUS AND METHOD FOR CONTROLLING AUTONOMOUS DRIVING

CROSS-REFERENCE TO RELATED APPLICATION

This application claims the benefit of and priority to Korean Patent Application No. 10-2023-0179093, filed on Dec. 11, 2023, the entire contents of which are hereby incorporated herein by reference.

TECHNICAL FIELD

The present disclosure relates to a vehicle control apparatus and a method thereof.

BACKGROUND

With the development of autonomous driving control and/or semi-autonomous driving control technology, a stable driving technology for a host vehicle may gradually become more advanced. For example, a technology may be developed to calculate the required acceleration required for a current host vehicle based on the host vehicle's driving environment, real-time driving speed, and/or driving acceleration and to control an acceleration device (e.g., a motor) and/or a deceleration device (e.g., a brake) based on the calculated required acceleration.

Among driving control types for the host vehicle, there may be a control algorithm used in consideration of characteristics of a driving road. For example, if the host vehicle is driving on a downhill road, or the host vehicle is continuously driven based on the required acceleration, the host vehicle may drive at acceleration higher than the required acceleration. In this situation, the vehicle control apparatus may control the host vehicle based on converting a driving operation to a regenerative braking operation.

For example, if the driving speed of the host vehicle exceeds a target driving speed in the driving state, the vehicle control apparatus may perform the regenerative braking operation in some cases. In this situation, it may be relatively difficult to control the host vehicle's driving speed to accurately match the target driving speed. As the regenerative braking and driving operations are performed repeatedly, users may experience an uncomfortable ride. Moreover, in a process of performing regenerative braking, criteria for setting a control amount (e.g., torque) may be unclear.

SUMMARY

The present disclosure was made to solve the above-mentioned problems occurring in the prior art while advantages achieved by the prior art are maintained intact.

An aspect of the present disclosure provides a vehicle control apparatus that may determine a section in which a control command value corresponding to a required acceleration is present. The apparatus may selectively use some of devices included in an acceleration device or a deceleration device based on the identified result, thereby performing high-accuracy speed control.

An aspect of the present disclosure provides a vehicle control apparatus that may set an operating state of the host vehicle to an operating state of an acceleration device. The apparatus may identify a device used immediately before to control the driving speed for the host vehicle. The apparatus may determine a device to be used to control the driving speed depending on the type of the identified device.

An aspect of the present disclosure provides a vehicle control apparatus that may selectively use either an acceleration device or a deceleration device based on a value of a control command generated based on normalizing a required acceleration. The apparatus may determine whether to further use an additional accelerator (e.g., a second accelerator) included in the acceleration device, based on the value of the control command while performing host vehicle control using a first accelerator.

An aspect of the present disclosure provides a more efficient and stable vehicle control method based on performing continuous and adaptive switching of control when it is necessary to switch a control mode to a deceleration control mode while acceleration control is performed on the host vehicle, or when the control mode needs to be switched to an acceleration control mode while deceleration control is performed.

The technical problems to be solved by the present disclosure are not limited to the aforementioned problems. Other technical problems not mentioned herein should be more clearly understood from the following description by those having ordinary skill in the art to which the present disclosure pertains.

According to an aspect of the present disclosure, a vehicle control apparatus is provided. The vehicle control apparatus includes a sensor device, an acceleration device configured to adjust a driving speed of a host vehicle, and a deceleration device configured to adjust the driving speed of the host vehicle. The vehicle control apparatus also includes a memory and a control device operatively connected to the sensor device, the acceleration device, the deceleration device, and the memory. The memory is configured to store instructions that, when executed by the control device, cause the vehicle control apparatus to set an initial state of the host vehicle to an acceleration device operating state. The instructions, when executed by the control device, may also cause the control apparatus to generate a required acceleration based on driving situation information and a host vehicle acceleration obtained based on the sensor device. The instructions, when executed by the control device, may further cause the control apparatus to identify a control command value, which corresponds to the required acceleration and which is to be delivered to at least one of the acceleration device or the deceleration device. The instructions, when executed by the control device, may further still cause the control apparatus to control at least one of the acceleration device or the deceleration device based on control information of a section including the control command value.

According to an embodiment, the instructions, when executed by the control device, may cause the vehicle control apparatus to determine whether the control command value is smaller than a first reference value when a previously operated device for adjusting the driving speed is the acceleration device. The instructions, when executed by the control device, may also cause the vehicle control apparatus to set a current state of the host vehicle to the acceleration device operating state and control the acceleration device based on a greater value among the control command value and a minimum driving amount, when the control command value is greater than or equal to the first reference value.

According to an embodiment, the instructions, when executed by the control device, may cause the vehicle control apparatus to determine whether the control command value is smaller than a first reference value when a previously operated device for adjusting the driving speed is the acceleration device. The instructions, when executed by the control device, may also cause the vehicle control apparatus to set a current state of the host vehicle to a deceleration device operating state and control the deceleration device based on a smaller value among the control command value and a minimum driving amount, when the control command value is smaller than the first reference value.

According to an embodiment the instructions, when executed by the control device, may cause the vehicle control apparatus to determine whether the control command value is greater than a second reference value when a previously operated device for adjusting the driving speed is the deceleration device. The instructions, when executed by the control device, may also cause the vehicle control apparatus to set a current state of the host vehicle to a deceleration device operating state and control the deceleration device based on a smaller value among the control command value and a minimum driving amount, when the control command value is smaller than or equal to the second reference value.

According to an embodiment, the instructions, when executed by the control device, may cause the vehicle control apparatus to determine whether the control command value is greater than a second reference value when a previously operated device for adjusting the driving speed is the deceleration device. The instructions, when executed by the control device, may also cause the vehicle control apparatus to set a current state of the host vehicle to the acceleration device operating state and control the acceleration device based on a greater value among the control command value and a minimum driving amount, when the control command value is greater than the second reference value.

According to an embodiment, the acceleration device may include a first accelerator and a second accelerator. The deceleration device may include a first decelerator and a second decelerator. According to an embodiment, the instructions, when executed by the control device, may cause the vehicle control apparatus to determine that the control command value is included in a first section when the control command value is greater than a sum of a first maximum driving amount of the first decelerator and a first threshold value. The instructions, when executed by the control device, may also cause the vehicle control apparatus to set a current state of the host vehicle to a simultaneous acceleration device operating state based on first control information corresponding to the first section. The instructions, when executed by the control device, may additionally cause the vehicle control apparatus to control the first accelerator based on the first maximum driving amount and control the second accelerator based on a value obtained by subtracting the first maximum driving amount from the control command value.

According to an embodiment, the instructions, when executed by the control device, may cause the vehicle control apparatus to determine that the control command value is included in a second section when the control command value is included between a sum of a first maximum driving amount of the first accelerator and a first threshold value and a difference between the first maximum driving amount and a second threshold value. The instructions, when executed by the control device, may also cause the vehicle control apparatus to set a current state of the host vehicle to a simultaneous acceleration device operating state based on second control information corresponding to the second section, when a previously operated device for adjusting the driving speed is the first accelerator and the second accelerator. The instructions, when executed by the control device, may additionally cause the vehicle control apparatus to control the first accelerator based on a smaller value among the first maximum driving amount and the control command value and control the second accelerator based on a greater value among a minimum driving amount and a difference between the control command value and the first maximum driving amount.

According to an embodiment, the instructions, when executed by the control device, may cause the vehicle control apparatus to determine that the control command value is included in a second section when the control command value is included between a sum of a first maximum driving amount of the first accelerator and a first threshold value and a difference between the first maximum driving amount and a second threshold value. The instructions, when executed by the control device, may also cause the vehicle control apparatus to set a current state of the host vehicle to a first acceleration device operating state based on second control information corresponding to the second section, when a previously operated device for adjusting the driving speed is the first accelerator. The instructions, when executed by the control device, may additionally cause the vehicle control apparatus to control the first accelerator based on a smaller value among the first maximum driving amount and the control command value.

According to an embodiment, the instructions, when executed by the control device, may cause the vehicle control apparatus to determine that the control command value is included in a third section when the control command value is included between a difference between a first maximum driving amount of the first accelerator and a second threshold value and a sum of a minimum driving amount and a third threshold value. The instructions, when executed by the control device, may also cause the vehicle control apparatus to set a current state of the host vehicle to a first accelerator operating state based on third control information corresponding to the third section. The instructions, when executed by the control device, may additionally cause the vehicle control apparatus to control the first accelerator based on the control command value.

According to an embodiment, the instructions, when executed by the control device, may cause the vehicle control apparatus to determine that the control command value is included in a fourth section when the control command value is included between a sum of a minimum driving amount and a third threshold value and a difference between a minimum driving amount and a fourth threshold value. The instructions, when executed by the control device, may also cause the vehicle control apparatus to set a current state of the host vehicle to a first acceleration device operating state based on fourth control information corresponding to the fourth section, when a previously operated device for adjusting the driving speed is the first accelerator. The instructions, when executed by the control device, may additionally cause the vehicle control apparatus to control the first accelerator based on a greater value of the control command value and the minimum driving amount.

According to an embodiment, the instructions, when executed by the control device, may cause the vehicle control apparatus to determine that the control command value is included in a fourth section when the control command value is included between a sum of a minimum driving amount and a third threshold value and a difference between the minimum driving amount and a fourth threshold value. The instructions, when executed by the control device, may also cause the vehicle control apparatus to set a current state of the host vehicle to a first deceleration device operating state based on fourth control information corresponding to the fourth section, when a previously operated device for adjusting the driving speed is the first decelerator. The instructions, when executed by the control device, may additionally cause the vehicle control apparatus to control the first decelerator based on a smaller value of the control command value and the minimum driving amount.

According to an embodiment, the instructions, when executed by the control device, may cause the vehicle control apparatus to determine that the control command value is included in a fifth section when the control command value is included between a difference between a minimum driving amount and a fourth threshold value and a sum of a second maximum driving amount and a fifth threshold value. The instructions, when executed by the control device, may also cause the vehicle control apparatus to set a current state of the host vehicle to a first decelerator operating state based on fifth control information corresponding to the fifth section. The instructions, when executed by the control device, may additionally cause the vehicle control apparatus to control the first decelerator based on the control command value.

According to an embodiment, the instructions, when executed by the control device, may cause the vehicle control apparatus to determine that the control command value is included in a sixth section when the control command value is included between a sum of a second maximum driving amount of the first decelerator and a fifth threshold value and a difference between the second maximum driving amount and a sixth threshold value. The instructions, when executed by the control device, may also cause the vehicle control apparatus to set a current state of the host vehicle to a simultaneous deceleration device operating state based on sixth control information corresponding to the sixth section, when a previously operated device for adjusting the driving speed is the first decelerator and the second decelerator. The instructions, when executed by the control device, may additionally cause the vehicle control apparatus to control the first decelerator based on a greater value of the control command value and the second maximum driving amount and control the second decelerator based on a smaller value among a minimum driving amount and a sum of the control command value and a first maximum driving amount of the first accelerator.

According to an embodiment, the instructions, when executed by the processor, may cause the vehicle control apparatus to determine that the control command value is included in a sixth section when the control command value is included between a sum of a second maximum driving amount of the first decelerator and a fifth threshold value and a difference between the second maximum driving amount and a sixth threshold value. The instructions, when executed by the control device, may also cause the vehicle control apparatus to set a current state of the host vehicle to a first deceleration device operating state based on sixth control information corresponding to the sixth section, when a previously operated device for adjusting the driving speed is the first decelerator. The instructions, when executed by the control device, may additionally cause the vehicle control apparatus to control the first decelerator based on a greater value of the control command value and the second maximum driving amount.

According to an embodiment, the instructions, when executed by the control device, may cause the vehicle control apparatus to determine that the control command value is included in a seventh section when the control command value is smaller than or equal to a difference between a second maximum driving amount of the first decelerator and a sixth threshold value. The instructions, when executed by the control device, may also cause the vehicle control apparatus to set a current state of the host vehicle to a simultaneous deceleration device operating state based on seventh control information corresponding to the seventh section. The instructions, when executed by the control device, may additionally cause the vehicle control apparatus to control the first decelerator based on the second maximum driving amount and control the second decelerator based on a value from summing the control command value and a first maximum driving amount of the first accelerator.

According to another aspect of the present disclosure, a vehicle control method is provided. The vehicle control method includes setting, by a control device, an initial state of a host vehicle to an acceleration device operating state. The vehicle control method also includes generating, by the control device, a required acceleration based on driving situation information and a host vehicle acceleration obtained based on a sensor device. The vehicle control method additionally includes identifying, by the control device, a control command value that corresponds to the required acceleration and that is to be delivered to at least one of an acceleration device or a deceleration device. The vehicle control method further includes controlling, by the control device, at least one of the acceleration device or the deceleration device based on control information of a section including the control command value.

According to an embodiment, the vehicle control method may further include determining, by the control device, whether the control command value is smaller than a first reference value when a previously operated device for adjusting a driving speed of the host vehicle is the acceleration device. The vehicle control method may also include setting, by the control device, a current state of the host vehicle to the acceleration device operating state, and controlling the acceleration device based on a greater value among the control command value and a minimum driving amount, when the control command value is greater than or equal to the first reference value.

According to an embodiment, the vehicle control method may further include determining, by the control device, whether the control command value is smaller than a first reference value when a previously operated device for adjusting a driving speed of the host vehicle is the acceleration device. The vehicle control method may also include setting, by the control device, a current state of the host vehicle to a deceleration device operating state, and controlling the deceleration device based on a smaller value among the control command value and a minimum driving amount when the control command value is smaller than the first reference value.

According to an embodiment, the vehicle control method may further include determining, by the control device, whether the control command value is greater than a second reference value, when a previously operated device for adjusting a driving speed of the host vehicle is the deceleration device. The vehicle control method may also include setting, by the control device, a current state of the host vehicle to a deceleration device operating state, and controlling the deceleration device based on a smaller value among the control command value and a minimum driving amount when the control command value is smaller than or equal to the second reference value.

According to an embodiment, the vehicle control method may further include determining, by the control device, whether the control command value is greater than a second reference value, when a previously operated device for adjusting a driving speed of the host vehicle is the deceleration device. The vehicle control method may also include setting, by the control device, a current state of the host vehicle to the acceleration device operating state, and controlling the acceleration device based on a greater value among the control command value and a minimum driving amount, when the control command value is greater than the second reference value.

BRIEF DESCRIPTION OF THE DRAWINGS

The above and other objects, features, and advantages of the present disclosure should be more apparent from the following detailed description taken in conjunction with the accompanying drawings, in which.

Figure 1:
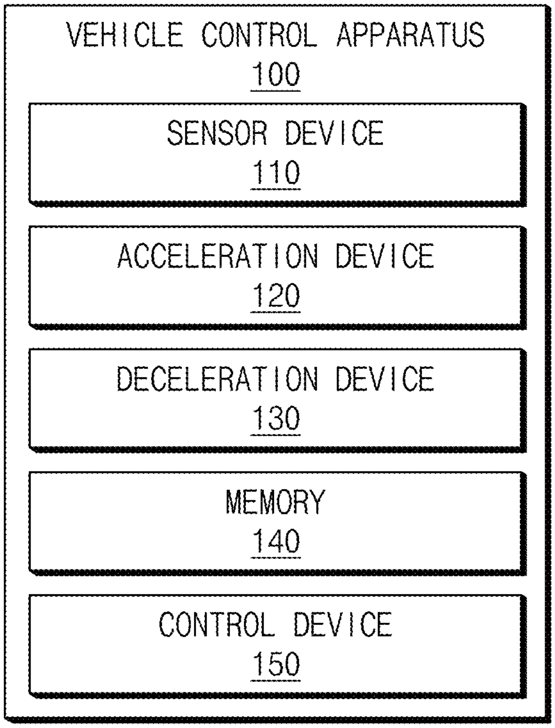
FIG. 1 is a block diagram showing components of a vehicle control apparatus, according to an embodiment of the present disclosure.

With regard to description of drawings, the same or similar components are designated by the same or similar reference signs.

DETAILED DESCRIPTION

Hereinafter, embodiments of the present disclosure are described in detail with reference to the accompanying drawings. In adding reference numerals to components of the drawings, it should be noted that the same components are designated by the same reference numerals even when the components are illustrated in different drawings. Furthermore, in describing the embodiments of the present disclosure, a detailed description associated with well-known functions or configurations have been omitted where it was determined that the detailed description may unnecessarily obscure the gist of the present disclosure.

In describing elements of an embodiment of the present disclosure, the terms first, second, A, B, (a), (b), and the like may be used herein. These terms are only used to distinguish one element from another element. These terms do not limit the corresponding elements irrespective of the nature, order, or priority of the corresponding elements. Furthermore, unless otherwise defined, all terms including technical and scientific terms used herein should be interpreted as is customary in the art to which the present disclosure belongs. It should be understood that terms used herein should be interpreted as including a meaning that is consistent with their meaning in the context of the present disclosure and the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

Hereinafter, various embodiments of the present disclosure are described in detail with reference to FIGS. 1-7.

FIG. 1 is a block diagram showing components of a vehicle control apparatus, according to an embodiment of the present disclosure.

According to an embodiment, a vehicle control apparatus 100 may include a sensor device 110, an acceleration device 120, a deceleration device 130, a memory 140, and/or a control device 150. The configuration of the vehicle control apparatus 100 shown in FIG. 1 is an example, and embodiments of the present disclosure are not limited thereto. For example, the vehicle control apparatus 100 may further include components not shown in FIG. 1 (e.g., at least one of a communication device, an interface device, a display device, a notification device, or any combination thereof).

According to an embodiment, the sensor device 110 may obtain various pieces of information about the driving of a host vehicle.

For example, the sensor device 110 may obtain acceleration and/or driving situation information of the host vehicle.

In embodiments, the sensor device 110 may include at least one sensor including at least one of a camera, radar, or light detection and ranging (LiDAR) device, or any combination thereof.

The sensor device 110 may obtain, based on at least one sensor, information about an external object (e.g., at least one of a person, another vehicle, a building, a structure, or any combination thereof).

In an embodiment, the sensor device 110 may obtain information about at least one of the host vehicle's real-time driving speed, real-time driving acceleration, driving direction, driving route, or driving history, or any combination thereof.

For example, the sensor device 110 may obtain information about at least one of a driving speed of another vehicle adjacent to the host vehicle, a driving acceleration of the other vehicle, a driving direction of the other vehicle, a driving route of the other vehicle, a type of the other vehicle, a condition of the other vehicle, a gradient of the other vehicle, a separation distance between the host vehicle and the other vehicle, or any combination thereof.

According to an embodiment, the acceleration device 120 and the deceleration device 130 may include at least one accelerator and/or at least one decelerator.

For example, the acceleration device 120 may include at least one accelerator (e.g., a first accelerator and/or a second accelerator) provided to increase the driving speed of the host vehicle. The first accelerator may be a main accelerator that is preferentially used to increase the driving speed of the host vehicle. The second accelerator may be an auxiliary accelerator used if the first accelerator alone is insufficient to increase the driving speed of the host vehicle to the target driving speed.

In embodiments, the acceleration device 120 may include at least one of a motor, an engine, an accelerator, or any combination thereof.

In an embodiment, the deceleration device 130 may include at least one decelerator (e.g., a first decelerator and/or a second decelerator) provided to reduce the driving speed of the host vehicle. The first decelerator may be a main decelerator that is preferentially used to decrease the driving speed of the host vehicle. The second decelerator may be an auxiliary accelerator used if the first decelerator alone is insufficient to decrease the driving speed of the host vehicle to the target driving speed.

According to an embodiment, the memory 140 may store instructions or data. For example, the memory 140 may store one or more instructions that, when executed by the control device 150, cause the vehicle control apparatus 100 to perform various operations.

In an embodiment, the memory 140 and the control device 150 may be implemented as one chipset. The control device 150 may include at least one of a communication processor or a modem.

The memory 140 may store various pieces of information related to the vehicle control apparatus 100. For example, the memory 140 may store information about the operation history of the control device 150. For example, the memory 140 may store information related to states and/or operations of components (e.g., at least one of an engine control unit (ECU), the sensor device 110, the acceleration device 120, the deceleration device 130, the memory 140, or any combination thereof) of the host vehicle.

In embodiments, the memory 140 may include different types of storage devices. For example, the memory 140 may include at least one of a random-access memory (RAM), an embedded multi-media card (eMMC), or any combination thereof.

The RAM may temporarily (or transiently) store data (e.g., driving data) regarding the operation of the vehicle control apparatus 100 and/or the host vehicle to be controlled by the vehicle control apparatus 100. The RAM may include at least one buffer. The vehicle control apparatus 100 may store, in the RAM, at least one node obtained based on dividing pieces of data that are collected (or identified) while autonomous driving control is performed on the host vehicle, based on unit times.

The eMMC may include an embedded multimedia card. The eMMC may store data for a longer period of time than the RAM. The eMMC may be implemented as a separate memory chip separate from the RAM.

According to an embodiment, the control device 150 may be operatively connected to the sensor device 110, the acceleration device 120, the deceleration device 130, and/or the memory 140. The control device 150 may control operations of the sensor device 110, the acceleration device 120, the deceleration device 130, and the memory 140.

In an embodiment, the control device 150 may set an initial state of the host vehicle to an acceleration device operating state.

For example, in a situation where control of the host vehicle is started, the control device 150 may set the initial state of the host vehicle to an acceleration device operating state including information indicating that the acceleration device 120, which is used more frequently than the deceleration device 130, was operating.

The control device 150 may generate the required acceleration based on the acceleration and driving situation information of the host vehicle obtained based on a sensor device.

For example, the control device 150 may generate, based on at least part of driving information of the host vehicle and/or information about the driving environment obtained based on the sensor device 110, the required acceleration for adjusting the driving speed of the host vehicle.

In an embodiment, when it is identified that the host vehicle needs to be accelerated, the control device 150 may generate the required acceleration as a positive value.

On the other hand, when it is identified that the host vehicle needs to be decelerated, the control device 150 may generate the required acceleration as a negative value.

The control device 150 may identify the control command value (e.g. the level of a control command) to be transmitted to at least one of the acceleration device 120, the deceleration device 130, or any combination thereof.

The control command may include a value that corresponds to the required acceleration and that is obtained as the control device 150 performs normalization based on the required acceleration.

For example, in an embodiment in which each of the acceleration device 120 and the deceleration device 130 includes two devices, the control command may be generated as a value corresponding to −200% to +200%.

In an embodiment, the first accelerator included in the acceleration device 120 may operate based on a control command of 0% to 100%. For example, the case that the control command is 0% may be defined as the case that the first accelerator does not operate. On the other hand, the case that the control command is 100% may be defined as the case that the first accelerator operates at a maximum output.

In an embodiment, the second accelerator included in the acceleration device 120 may operate based on a control command of 100% to 200%. For example, the case that the control command is 100% may be defined as the case that the first accelerator operates at a maximum output and the second accelerator does not operate. On the other hand, the case that the control command is 200% may be defined as the case that both the first accelerator and the second accelerator operate at a maximum output.

In an embodiment, the first decelerator included in the deceleration device 130 may operate based on a control command of −100% to 0%. For example, the case that the control command is −100% may be defined as the case that the first decelerator operates at a maximum output. On the other hand, the case that the control command is 0% may be defined as the case that the first decelerator does not operate.

In an embodiment, the second decelerator included in the deceleration device 130 may operate based on a control command of −200% to −100%. For example, the case that the control command is −200% may be defined as the case that both the first decelerator and the second decelerator operate at a maximum output. On the other hand, the case that the control command is −100% may be defined as the case that the first decelerator operates at a maximum output and the second decelerator does not operate.

The control device 150 may control at least one of the acceleration device 120, the deceleration device 130, or any combination thereof based on the control information of a section including the control command value.

For example, the control device 150 may determine (or identify) whether an operating device that is used right before (hereinafter referred to as a "previously operated device") for adjusting the driving speed is the acceleration device 120 or the deceleration device 130.

In an embodiment, when the previously operated device for adjusting the driving speed is the acceleration device 120, the control device 150 may determine whether the control command value is smaller than the first reference value. For example, if the control command value is greater than or equal to the first reference value, the control device 150 may set a current state of the host vehicle to an acceleration device operating state, and may control the acceleration device 120 based on the greater value among the control command and the minimum driving amount (e.g., 0).

In an embodiment, when the previously operated device for adjusting the driving speed is the acceleration device 120, the control device 150 may determine whether the control command value is smaller than the first reference value. For example, if the control command value is smaller than the first reference value, the control device 150 may set the current state of the host vehicle to a deceleration device operating state, and may control the deceleration device 130 based on the smaller value among the control command and the minimum driving amount.

In an embodiment, when the previously operated device for adjusting the driving speed is the deceleration device 130, the control device 150 may determine whether the control command value is greater than a second reference value. For example, if the control command value is smaller than or equal to the second reference value, the control device 150 may set the current state of the host vehicle to the deceleration device operating state, and may control the deceleration device 130 based on the smaller value among the control command and the minimum driving amount.

In an embodiment, when the previously operated device for adjusting the driving speed is the deceleration device 130, the control device 150 may determine whether the control command value is greater than the second reference value. For example, if the control command value is greater than the second reference value, the control device 150 may set the current state of the host vehicle to the acceleration device operating state, and may control the acceleration device 120 based on the greater value among the control command and the minimum driving amount.

The above example may be an embodiment in which each of the acceleration device 120 and the deceleration device 130 includes one device. Hereinafter, an embodiment in which each of the acceleration device 120 and the deceleration device 130 includes two devices is described.

In an embodiment, the control device 150 may set (or change) the current state of the host vehicle based on the control information of a section including the control command value. The control device may then determine a device to be operated from among devices included in the acceleration device 120 and the deceleration device 130 and may control the driving speed of the host vehicle based on the determined device.

In an embodiment, when the control command value exceeds the sum of the first maximum driving amount (e.g., the driving amount if the control command value is 100%) of the first accelerator and the first threshold value, the control device 150 may determine that the control command value is included in a first section. The control device 150 may set the current state of the host vehicle to a simultaneous acceleration device operating state based on first control information corresponding to the first section. The control device 150 may control the first accelerator based on the first maximum driving amount and may control the second accelerator based on a value from subtracting the first maximum driving amount from the control command value.

In an embodiment, if the control command value is included between the sum of the first maximum driving amount of the first accelerator and the first threshold value and a difference between the first maximum driving amount and a second threshold value, the control device 150 may determine that the control command value is included in the second section. For example, if the previously operated device for adjusting the driving speed is the first accelerator and the second accelerator, the control device 150 may set the current state of the host vehicle to the simultaneous acceleration device operating state based on second control information corresponding to the second section. The control device 150 may control the first accelerator based on the smaller value among the first maximum driving amount and the control command value, and may control the second accelerator based on the greater value among the minimum driving amount and a difference between the control command and the first maximum driving amount.

In an embodiment, when the control command value is included between the sum of the first maximum driving amount of the first accelerator and the first threshold value and a difference between the first maximum driving amount and a second threshold value, the control device 150 may determine that the control command value is included in the second section. For example, if the previously operated device for adjusting the driving speed is the first accelerator, the control device 150 may set the current state of the host vehicle to a first accelerator operating state based on the second control information corresponding to the second section. The control device 150 may control the first accelerator based on the smaller value among the first maximum driving amount and the control command value.

In an embodiment, when the control command value is included between a difference between the first maximum driving amount of the first accelerator and the second threshold value and the sum of the minimum driving amount and a third threshold value, the control device 150 may determine that the control command value is included in a third section. For example, the control device 150 may set the current state of the host vehicle to the first accelerator operating state based on third control information corresponding to the third section. The control device 150 may control the first accelerator based on the control command value.

In an embodiment, when the control command value is included between the sum of the minimum driving amount (e.g., the driving amount if the control command level is 0%) and the third threshold value and a difference between the minimum driving amount and a fourth threshold value, the control device 150 may determine that the control command value is included in a fourth section. For example, if the previously operated device for adjusting the driving speed is the first accelerator, the control device 150 may set the current state of the host vehicle to the first accelerator operating state based on fourth control information corresponding to the fourth section. The control device 150 may control the first accelerator based on the greater value among the control command value and the minimum driving amount.

In an embodiment, when the control command value is included between the sum of the minimum driving amount and the third threshold value and the difference between the minimum driving amount and the fourth threshold value, the control device 150 may determine that the control command value is included in the fourth section. For example, if the previously operated device for adjusting the driving speed is the first decelerator, the control device 150 may set the current state of the host vehicle to a first decelerator operating state based on the fourth control information corresponding to the fourth section. The control device 150 may control the first decelerator based on the smaller value among the control command value and the minimum driving amount.

In an embodiment, when the control command value is included between a difference between the minimum driving amount and the fourth threshold value and the sum of the second maximum driving amount and a fifth threshold value, the control device 150 may determine that the control command value is included in a fifth section. For example, the control device 150 may set the current state of the host vehicle to the first decelerator operating state based on fifth control information corresponding to the fifth section. The control device 150 may control the first decelerator based on the control command value.

In an embodiment, when the control command value is included between the sum of the second maximum driving amount of the first decelerator and the fifth threshold value and a difference between the second maximum driving amount and a sixth threshold value, the control device 150 may determine that the control command value is included in a sixth section. For example, if the previously operated device for adjusting the driving speed is the first decelerator and the second decelerator, the control device 150 may set the current state of the host vehicle to the simultaneous deceleration device operating state based on sixth control information corresponding to the sixth section. The control device 150 may control the first decelerator based on the greater value among the control command value and the second maximum driving amount.

In an embodiment, when the control command value is included between the sum of the second maximum driving amount (e.g., the driving amount if the control command value is −100%) of the first decelerator and the fifth threshold value and a difference between the second maximum driving amount and the sixth threshold value, the control device 150 may determine that the control command value is included in the sixth section. For example, if the previously operated device for adjusting the driving speed is the first decelerator, the control device 150 may set the current state of the host vehicle to the first decelerator operating state based on the sixth control information corresponding to the sixth section. The control device 150 may control the first decelerator based on the greater value among the control command value and the second maximum driving amount.

In an embodiment, when the control command value is smaller than or equal to a difference between the second maximum driving amount of the first decelerator and the sixth threshold value, the control device 150 may determine that the control command value is included in a seventh section. For example, the control device 150 may set the current state of the host vehicle to a simultaneous deceleration device operating state based on seventh control information corresponding to the seventh section. The control device 150 may control the first decelerator based on the second maximum driving amount, and may control the second decelerator based on the smaller value among the minimum driving amount and the sum of the control command value and the first maximum driving amount of the first accelerator.

The numerical limitations according to the above-described examples are illustrative, and embodiments of the present disclosure are not limited thereto. For example, the numerical limitations for the control command are illustrative and may be changed by a developer and/or a user's settings. Moreover, each of the acceleration device 120 and/or the deceleration device 130 may further include two or more devices.

Figure 2:
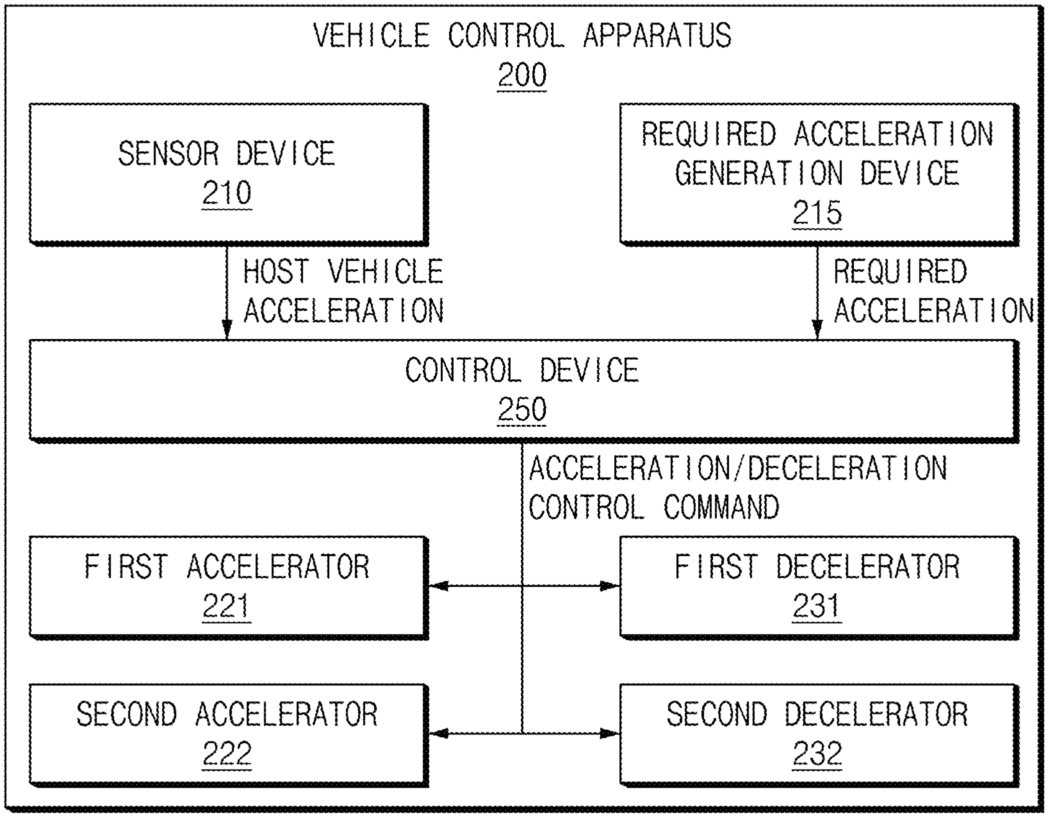
FIG. 2 is a conceptual diagram showing components of a vehicle control apparatus and operations of the vehicle control apparatus, according to an embodiment of the present disclosure.

FIG. 2 is a conceptual diagram showing components of a vehicle control apparatus and operations of the vehicle control apparatus, according to an embodiment of the present disclosure.

According to an embodiment, a vehicle control apparatus 200 (e.g., corresponding to the vehicle control apparatus 100 of FIG. 1) may include a sensor device 210 (e.g., corresponding to the sensor device 110 of FIG. 1), a required acceleration generation device 215, a control device 250 (e.g., corresponding to the control device 150 of FIG. 1), a first accelerator 221, a second accelerator 222, a first decelerator 231, and a second decelerator 232. Each of the first accelerator 221 and the second accelerator 222, and the first decelerator 231 and the second decelerator 232 may be implemented as a single device (e.g., the acceleration device 120 and the deceleration device 130 in FIG. 1). The control device 250 may be implemented to include the required acceleration generation device 215.

In an embodiment, the control device 250 may obtain, based on the sensor device 210, host vehicle acceleration.

The control device 250 may generate, based on the required acceleration generation device 215, the required acceleration for driving control (e.g., controlling of driving speed and/or driving acceleration adjustment) of the host vehicle.

The control device 250 may generate a control command based on at least part of pieces of information obtained based on the sensor device 210 and the required acceleration generation device 215.

For example, the control device 250 may generate the control command corresponding to the required acceleration and may control at least part of the accelerators and/or decelerators based on the control information of a section including the control command value.

Figure 3:
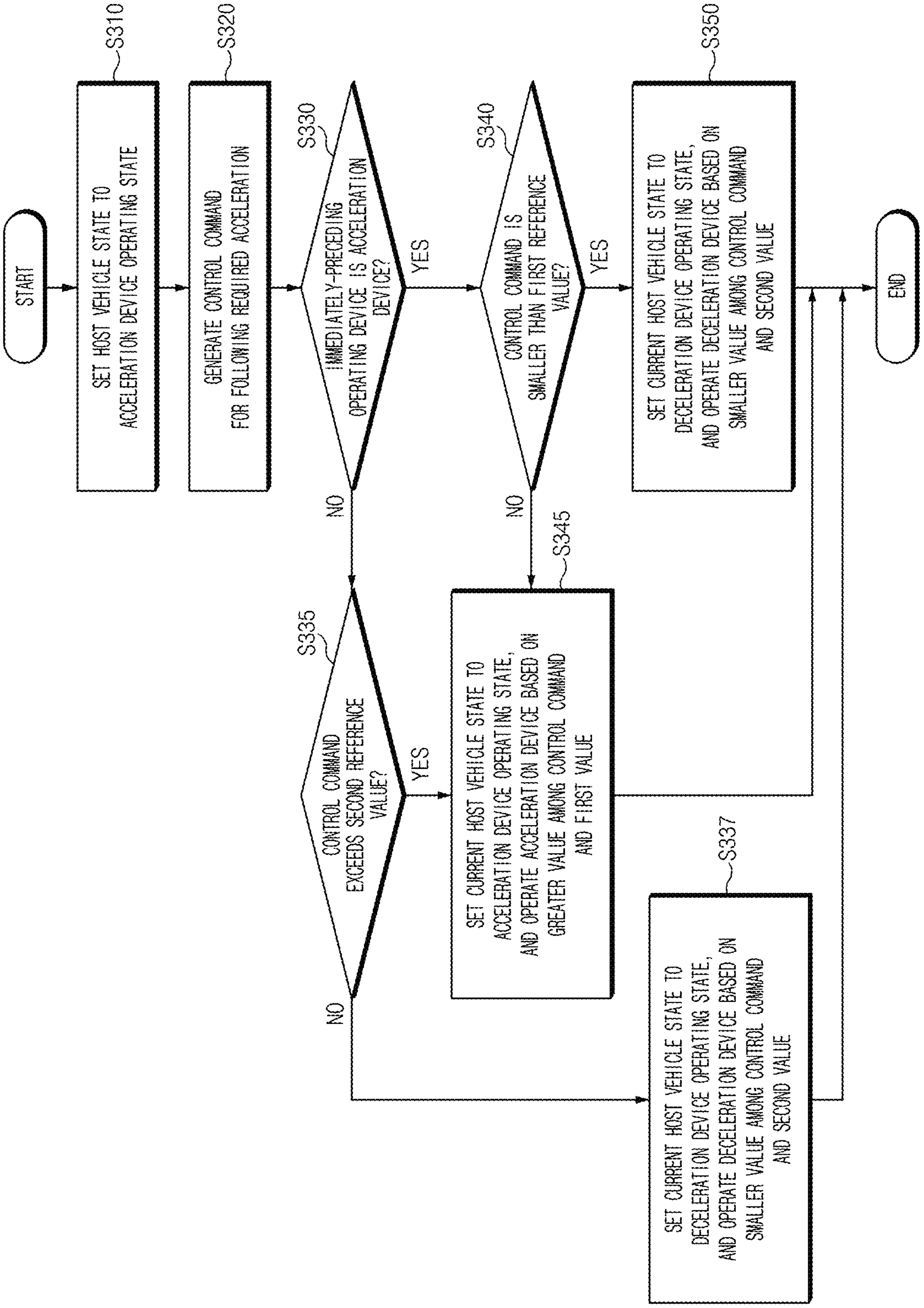
FIG. 3 is a flowchart of a vehicle control method, according to an embodiment of the present disclosure.

FIG. 3 is a flowchart of a vehicle control method, according to an embodiment of the present disclosure.

According to an embodiment, a vehicle control apparatus (e.g., the vehicle control apparatus 100 of FIG. 1) may perform operations described in FIG. 3. For example, at least some of components (e.g., the sensor device 110, the acceleration device 120, the deceleration device 130, the memory 140, and/or the control device 150 in FIG. 1) included in the vehicle control apparatus may be configured to perform operations of FIG. 3.

In an embodiment, operations S310-S350 of FIG. 3 may be sequentially performed. However, the operations S310-S350 are not necessarily performed sequentially. For example, the order of operations may be changed and/or at least two operations may be performed in parallel. Moreover, descriptions corresponding to or identical to the above-mentioned descriptions given with reference to FIG. 3 may be briefly described or omitted to avoid redundancy.

In an operation S310, the vehicle control apparatus may set a host vehicle state to an acceleration device operating state.

For example, the vehicle control apparatus may set an initial operating state of the host vehicle to the acceleration device operating state and may perform a required acceleration generating operation based on host vehicle acceleration and/or driving situation information.

In an operation S320, the vehicle control apparatus may generate a control command for following the required acceleration.

For example, the vehicle control apparatus may generate the control command set such that the real-time driving acceleration of the host vehicle is capable of following the required acceleration.

In an embodiment, the control command may be a normalized value corresponding to the required acceleration. For example, in a case of a host vehicle including one accelerator and one decelerator according to an embodiment in FIG. 3, the control command may be generated as a value of, for example, −100% to 100%. For example, as the control command value is higher, the greater acceleration may be required. As the control command value is lower, the smaller acceleration may be required.

In an operation S330, the vehicle control apparatus may determine whether the previously operated device is an acceleration device.

For example, the vehicle control apparatus may determine whether a device most recently operated to adjust the speed (or to adjust acceleration) of the host vehicle is a device included in the acceleration device or a device included in the deceleration device.

In an embodiment, if the previously operated device is an acceleration device (Yes in the operation S330), the vehicle control apparatus may perform an operation S340.

On the other hand, if the previously operated device is not an acceleration device (e.g., if the previously operated device is a deceleration device) (No in the operation S330), the vehicle control apparatus may perform an operation S335.

In the operation S340, the vehicle control apparatus may determine whether the control command is smaller than the first reference value.

In an embodiment, if the control command is smaller than the first reference value (Yes in the operation S350), the vehicle control apparatus may perform an operation S350.

On the other hand, if the control command is greater than or equal to the first reference value (No in the operation S340), the vehicle control apparatus may perform an operation S345.

In an operation S350, the vehicle control apparatus may set a current host vehicle state to a deceleration device operating state, and may operate the deceleration device based on the smaller value among the control command and the second value.

In an operation S335, the vehicle control apparatus may determine whether the control command exceeds a second reference value.

In an embodiment, if the control command exceeds the second reference value (Yes in the operation S335), the vehicle control apparatus may perform the operation S345.

On the other hand, if the control command does not exceed the second reference value (NO in the operation S335), the vehicle control apparatus may perform an operation S337.

Further, if the control command is greater than or equal to the first reference value (No in the operation S340), the vehicle control apparatus may perform the operation S345.

In the operation S337, the vehicle control apparatus may set a current host vehicle state to a deceleration device operating state, and may operate the deceleration device based on the smaller value among the control command and the second value.

In the operation S345, the vehicle control apparatus may set the current host vehicle state to an acceleration device operating state, and may operate the acceleration device based on the greater value among the control command and the first value.

In an embodiment, the first value, the second value, the first reference value, and the second reference value may be setting values capable of being changed by a user and/or a developer. For example, the first value and the second value may be 0 (e.g., a control amount corresponding to a case where a device is not controlled). However, this is an example and embodiments of the present disclosure are not limited thereto.

Figure 4:
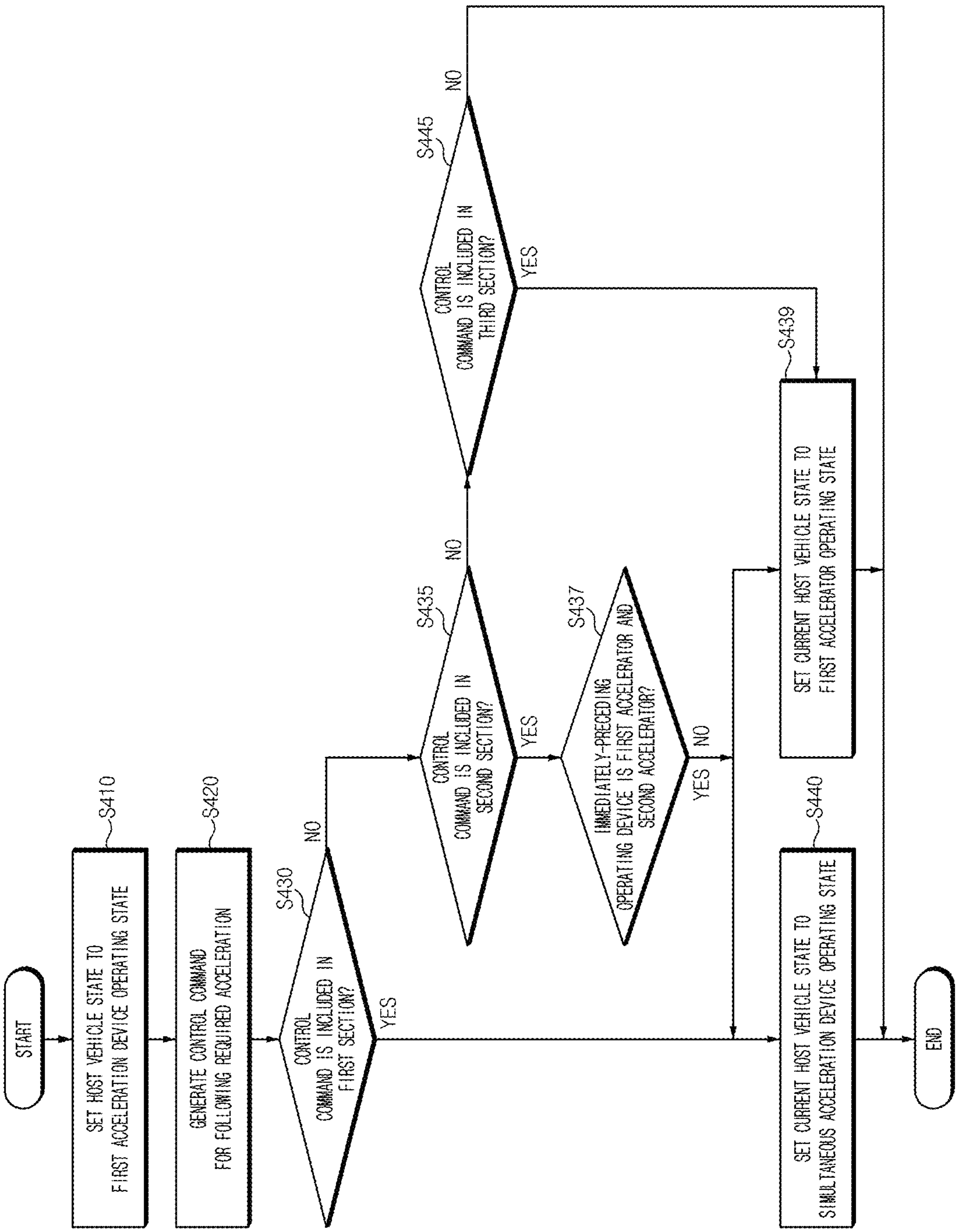
FIG. 4 is a flowchart of a vehicle control method, according to an embodiment of the present disclosure.

FIG. 4 is a flowchart of a vehicle control method, according to an embodiment of the present disclosure.

According to an embodiment, a vehicle control apparatus (e.g., the vehicle control apparatus 100 of FIG. 1) may perform operations described in FIG. 4. For example, at least some of components (e.g., the sensor device 110, the acceleration device 120, the deceleration device 130, the memory 140, and/or the control device 150 in FIG. 1) included in the vehicle control apparatus may be set to perform operations of FIG. 4.

In an embodiment, operations S410-S445 of FIG. 4 may be sequentially performed. However, the operations S410-S445 are not necessarily performed sequentially. For example, the order of operations may be changed and/or at least two operations may be performed in parallel. Moreover, descriptions corresponding to or identical to the above-mentioned descriptions given with reference to FIG. 4 may be briefly described or omitted to avoid redundancy.

In an operation S140, the vehicle control apparatus may set a host vehicle state to an acceleration device operating state.

For example, the vehicle control apparatus may set an initial operating state of the host vehicle to the acceleration device operating state and may perform the required acceleration generating operation based on host vehicle acceleration and/or driving situation information.

In an operation S420, the vehicle control apparatus may generate a control command for following the required acceleration.

For example, the vehicle control apparatus may generate the control command set such that the real-time driving acceleration of the host vehicle is capable of following the required acceleration.

In an embodiment, the control command may be a normalized value corresponding to the required acceleration. For example, in a case of a host vehicle including two accelerators and two decelerators according to an embodiment in FIG. 4, the control command may be generated as a value of, for example, −200% to 200%. For example, as the control command value is higher, the greater acceleration may be required. As the control command value is lower, the smaller acceleration may be required.

In an operation S430, the vehicle control apparatus may determine whether the control command is included in a first section.

For example, the first section may be a section in which the control command is greater than the sum of the first maximum driving amount (e.g., 100%) of the first accelerator and a first threshold value. In other words, the first section may be a section between "100%+first threshold value" and "200%".

In an embodiment, if the control command is included in the first section (Yes in the operation S430), the vehicle control apparatus may perform an operation S440.

On the other hand, if the control command is not included in the first section (No in the operation S430), the vehicle control apparatus may perform an operation S435.

In the operation S440, the vehicle control apparatus may set the current host vehicle state to a simultaneous acceleration device operating state.

For example, if the control command is included in the first section, the vehicle control apparatus may determine that acceleration control needs to be performed based on both the first accelerator and the second accelerator. Accordingly, the vehicle control apparatus may control the first accelerator based on the first maximum driving amount (e.g., 100%) and may control the second accelerator based on a value from subtracting the first maximum driving amount from the control command value.

In an operation S435, the vehicle control apparatus may determine whether the control command is included in a second section.

For example, the second section may be a section in which the control command is smaller than the sum of the first maximum driving amount (e.g., 100%) of the first accelerator and a first threshold value and is greater than a difference between the first maximum driving amount and a second threshold value. In other words, the second section may be a section between "100%+first threshold value" and "100%−second threshold value".

In an embodiment, if the control command is included in the second section (Yes in the operation S435), the vehicle control apparatus may perform an operation S437.

On the other hand, if the control command is not included in the second section (No in the operation S435), the vehicle control apparatus may perform an operation S445.

In the operation S437, the vehicle control apparatus may determine whether the previously operated device is the first accelerator and the second accelerator.

In an embodiment, if the previously operated device includes both the first accelerator and the second accelerator (Yes in the operation S437), the vehicle control apparatus may perform an operation S440.

On the other hand, if the previously operated device does not include both the first accelerator and the second accelerator (or is the first accelerator) (No in the operation S437), the vehicle control apparatus may perform an operation S439.

In the operation S439, the vehicle control apparatus may set the current host vehicle state to the first accelerator operating state.

For example, if the control command is included in the second section, the vehicle control apparatus may determine to use both the first accelerator and the second accelerator, or only the first accelerator. Accordingly, the vehicle control apparatus may use different types of accelerators based on which device is the previously operated device.

In an embodiment, if the previously operated device includes both the first accelerator and the second accelerator in a situation where the control command is included in the second section, the vehicle control apparatus may control the first accelerator based on the smaller value among the first maximum driving amount and the control command value, and may control the second accelerator based on the greater value among the minimum driving amount and a difference between the control command and the first maximum driving amount.

On the other hand, if the previously operated device does not include both the first accelerator and the second accelerator (or if it includes only the first accelerator) in a situation where the control command is included in the second section, the vehicle control apparatus may control the first accelerator based on the greater value among the control command and the first driving amount.

In the operation S445, the vehicle control apparatus may determine whether the control command is included in a third section.

For example, the third section may be a section in which the control command is smaller than a difference between the first maximum driving amount (e.g., 100%) of the first accelerator and the second threshold value and is greater than the sum of the minimum driving amount (e.g., corresponding to a case where the control command value is 0%) and a third threshold value. In other words, the third section may be a section between "0%+third threshold value" and "100%−second threshold value".

In an embodiment, if the control command is included in a third section (Yes in the operation S445), the vehicle control apparatus may perform the operation S439.

On the other hand, if the control command is not included in the third section (No in the operation S445), the vehicle control apparatus may terminate method. In an embodiment, if the control command is not included in the third section, the vehicle control apparatus may perform an operation S530 of FIG. 5.

Figure 5:
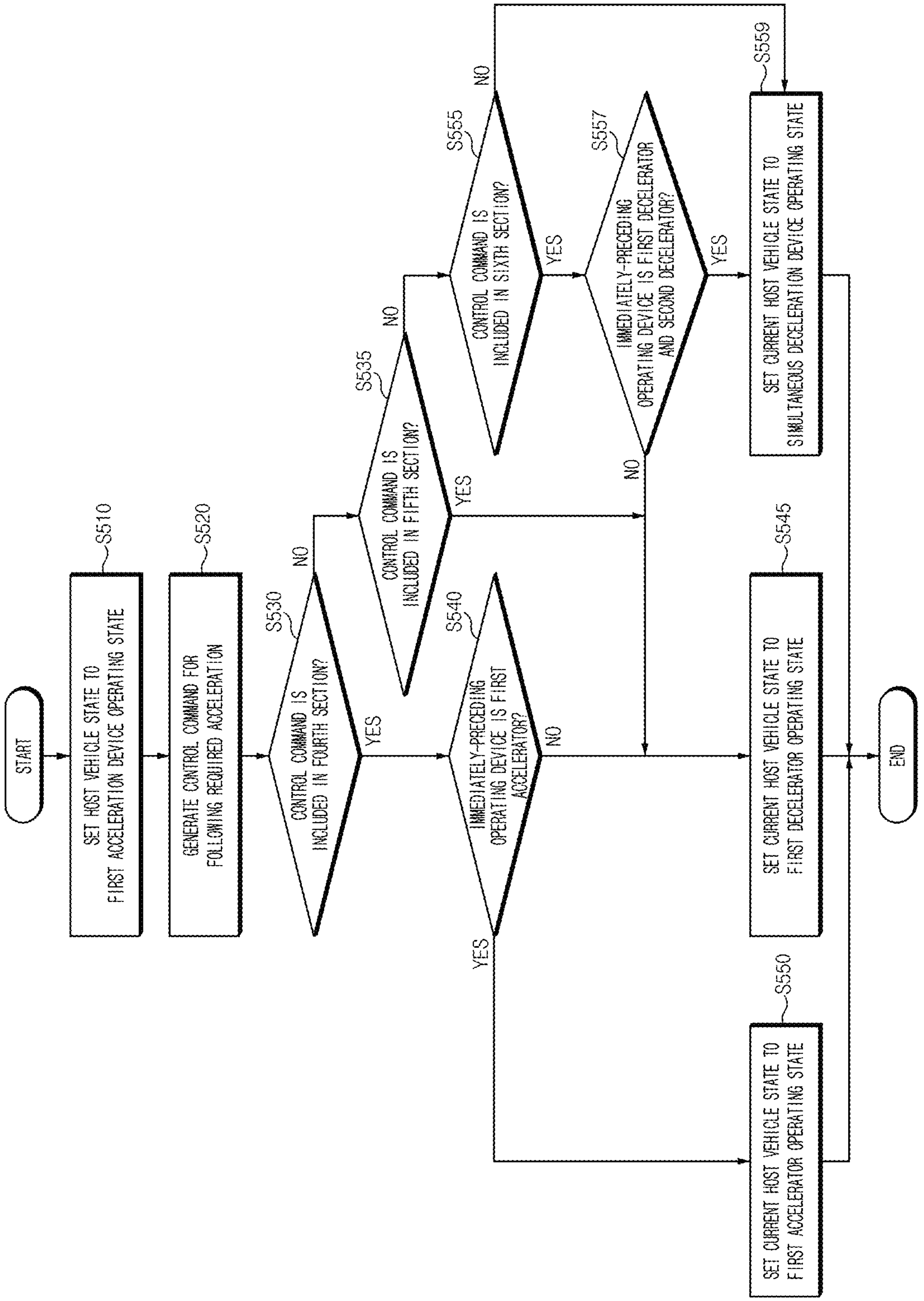
FIG. 5 is a flowchart of a vehicle control method, according to an embodiment of the present disclosure.

FIG. 5 is a flowchart of a vehicle control method, according to an embodiment of the present disclosure.

According to an embodiment, a vehicle control apparatus (e.g., the vehicle control apparatus 100 of FIG. 1) may perform operations described in FIG. 5. For example, at least some of components (e.g., the sensor device 110, the acceleration device 120, the deceleration device 130, the memory 140, and/or the control device 150 in FIG. 1) included in the vehicle control apparatus may be set to perform operations of FIG. 5.

In an embodiment, operations S510-S559 of FIG. 5 may be sequentially performed. However, the operation S510-S559 are not necessarily performed sequentially. For example, the order of operations may be changed and/or at least two operations may be performed in parallel. Moreover, descriptions corresponding to or identical to the above-mentioned descriptions given with reference to FIG. 5 may be briefly described or omitted to avoid redundancy.

In an embodiment, the vehicle control apparatus may sequentially perform some of the steps in FIG. 4 and some of the steps in FIG. 5. For example, if the vehicle control apparatus determines "No" in the operation S445 of FIG. 4, the vehicle control apparatus may omit operations S510 and S520 of FIG. 5 and may perform operations of FIG. 5 starting with the operation S530.

In an operation S510, the vehicle control apparatus may set a host vehicle state to an acceleration device operating state.

For example, the vehicle control apparatus may set an initial operating state of the host vehicle to the acceleration device operating state and may perform a required acceleration generating operation based on host vehicle acceleration and/or driving situation information.

In an operation S520, the vehicle control apparatus may generate a control command for following the required acceleration.

For example, the vehicle control apparatus may generate the control command set such that the real-time driving acceleration of the host vehicle is capable of following the required acceleration.

In an embodiment, the control command may be a normalized value corresponding to the required acceleration. For example, in a case of a host vehicle including two accelerators and two decelerators according to an embodiment in FIG. 5, the control command may be generated as a value of, for example, −200% to 200%. For example, as the control command value is higher, the greater acceleration may be required. As the control command value is lower, the smaller acceleration may be required.

In the operation S530, the vehicle control apparatus may determine whether the control command is included in a fourth section.

For example, the fourth section may be a section in which the control command is smaller than the sum of the minimum driving amount and a third threshold value and is greater than a difference between the minimum driving amount and a fourth threshold value. In other words, the fourth section may be a section between "0%−fourth threshold value" and "0%+third threshold value".

In an embodiment, if the control command is included in the fourth section (Yes in the operation S530), the vehicle control apparatus may perform an operation S540.

On the other hand, if the control command is not included in the fourth section (No in the operation S530), the vehicle control apparatus may perform an operation S535.

In the operation S540, the vehicle control apparatus may determine whether the previously operated device is the first accelerator.

In an embodiment, if the previously operated device includes the first accelerator (Yes in the operation S540), the vehicle control apparatus may perform an operation S550.

On the other hand, if the previously operated device does not include the first accelerator (No in the operation S540), the vehicle control apparatus may perform an operation S545.

In the operation S545, the vehicle control apparatus may set the current host vehicle state to a first decelerator operating state.

For example, the vehicle control apparatus may control the first decelerator based on the smaller value among the control command value and the minimum driving amount.

In the operation S550, the vehicle control apparatus may set the current host vehicle state to the first accelerator operating state.

For example, the vehicle control apparatus may control the first accelerator based on the greater value among the control command value and the minimum driving amount.

In the operation S535, the vehicle control apparatus may determine whether the control command is included in a fifth section.

For example, the fifth section may be a section in which the control command is smaller than a difference between the minimum driving amount and the fourth threshold value and is greater than the sum of the second maximum driving amount (e.g., −100%) of the first decelerator and the fifth threshold value. In other words, the fifth section may be a section between "−100%+fifth threshold value" and "0%−fourth threshold value".

In an embodiment, if the control command is included in the fifth section (Yes in the operation S535), the vehicle control apparatus may perform the operation S545.

On the other hand, if the control command is not included in the fifth section (No in the operation S535), the vehicle control apparatus may perform an operation S555.

In the operation S555, the vehicle control apparatus may determine whether the control command is included in a sixth section.

For example, the sixth section may be a section in which the control command is smaller than the sum of the second maximum driving amount (e.g., −100%) of the first decelerator and the fifth threshold value and is greater than a difference between the second maximum driving amount and a sixth threshold value. In other words, the fifth section may be a section between "−100%+fifth threshold value" and "−100%−sixth threshold value".

In an embodiment, if the control command is included in the sixth section (Yes in the operation S555), the vehicle control apparatus may perform an operation S557.

On the other hand, if the control command is not included in the sixth section (No in the operation S555), the vehicle control apparatus may perform an operation S559.

In the operation S557, the vehicle control apparatus may determine whether the previously operated device is the first decelerator and the second decelerator.

In an embodiment, if the previously operated device includes both the first decelerator and the second decelerator (Yes in the operation S557), the vehicle control apparatus may perform an operation S559.

On the other hand, if the previously operated device does not include both the first decelerator and the second decelerator (or is the first decelerator) (No in the operation S557), the vehicle control apparatus may perform the operation S545.

In the operation S559, the vehicle control apparatus may set the current host vehicle state to a simultaneous deceleration device operating state.

For example, if the control command is not included in the sixth section, the vehicle control apparatus may determine that the control command is included in a seventh section. For example, the seventh section may be a section between "−100%−sixth threshold value" and "−200%".

For example, in the seventh section, the vehicle control apparatus may determine that the host vehicle acceleration is capable of following the required acceleration if both the first decelerator and the second decelerator are operated.

For example, the vehicle control apparatus may control the first decelerator based on the second maximum driving amount and may control the second decelerator based on a value from summing the control command value and the first maximum driving amount of the first accelerator.

Figure 6:
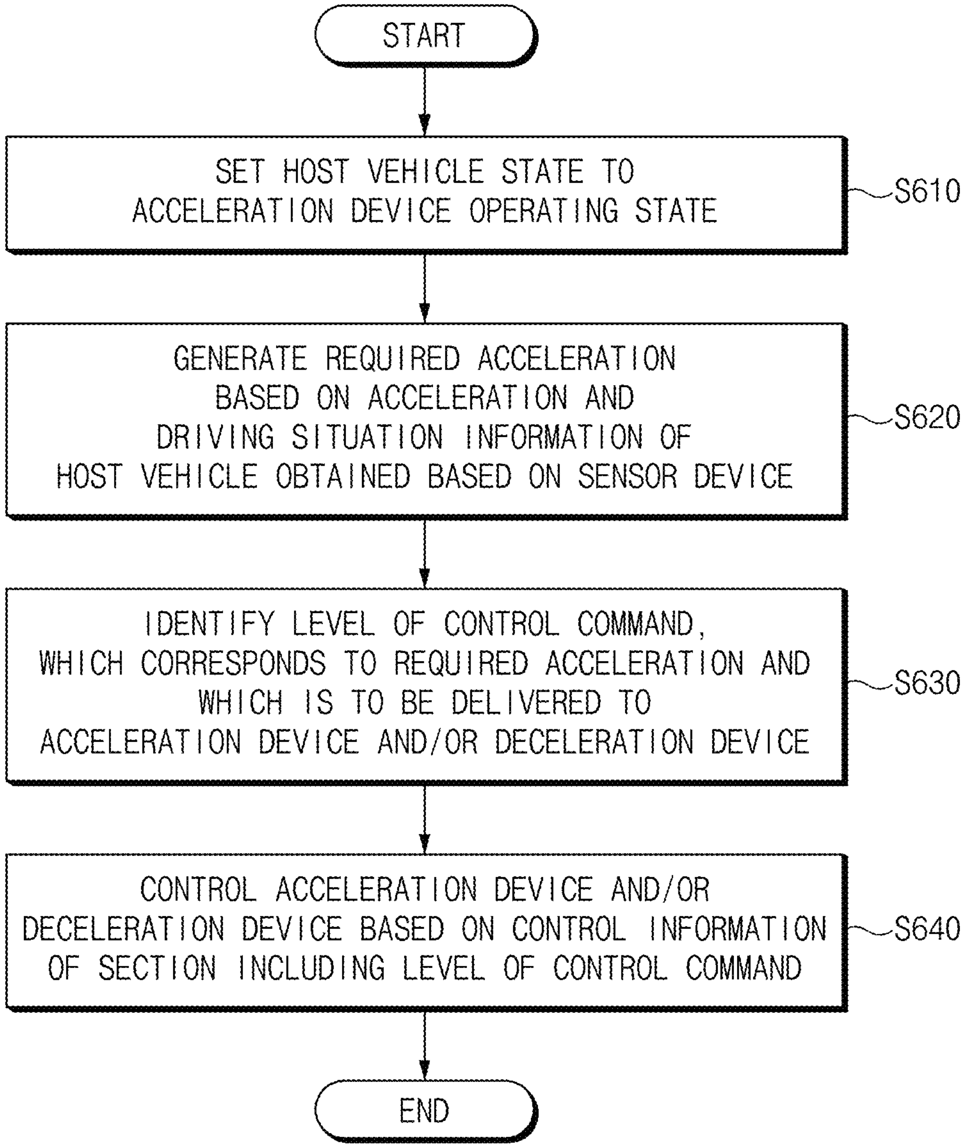
FIG. 6 is a flowchart of a vehicle control method, according to an embodiment of the present disclosure.

FIG. 6 is a flowchart of a vehicle control method, according to an embodiment of the present disclosure.

According to an embodiment, a vehicle control apparatus (e.g., the vehicle control apparatus 100 of FIG. 1) may perform operations described in FIG. 6. For example, at least some of components (e.g., the sensor device 110, the acceleration device 120, the deceleration device 130, the memory 140, and/or the control device 150 in FIG. 1) included in the vehicle control apparatus may be set to perform operations of FIG. 6.

In an embodiment, operations S610-S640 of FIG. 6 may be sequentially performed. However, the operations S610-S640 are not necessarily performed sequentially. For example, the order of operations may be changed and/or at least two operations may be performed in parallel. Moreover, descriptions corresponding to or identical to the above-mentioned descriptions given with reference to FIG. 6 may be briefly described or omitted to avoid redundancy.

In an operation S610, the vehicle control apparatus may set a host vehicle state to an acceleration device operating state.

For example, the vehicle control apparatus may set an initial operating state of the host vehicle to the acceleration device operating state and may perform a required acceleration generating operation based on host vehicle acceleration and/or driving situation information.

In an operation S620, vehicle control apparatus may generate the required acceleration based on the acceleration and driving situation information of the host vehicle obtained based on a sensor device.

In an operation S630, the vehicle control apparatus may identify the control command value, which corresponds to the required acceleration and which is to be delivered to an acceleration device and/or a deceleration device.

In an operation S640, the vehicle control apparatus may control the acceleration device and/or deceleration device based on control information of a section including the control command value.

Figure 7:
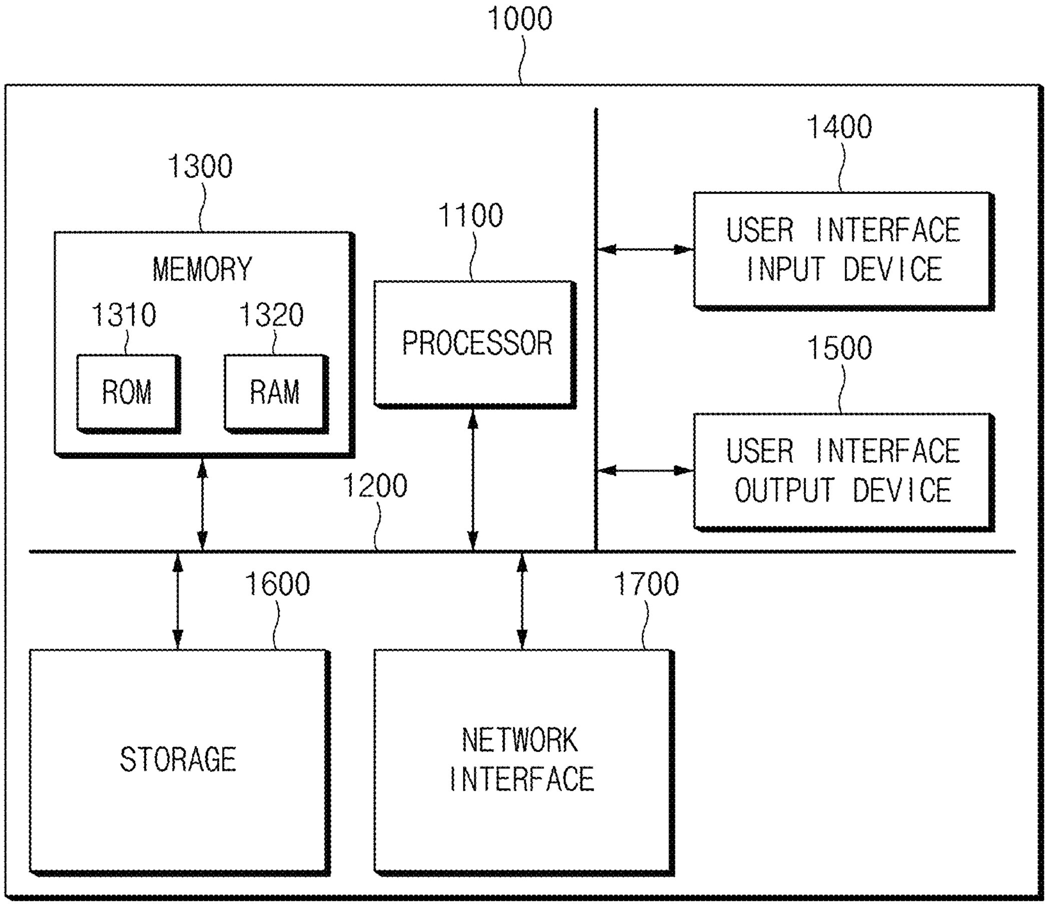
FIG. 7 shows a computing system related to a vehicle control apparatus or vehicle control method, according to an embodiment of the present disclosure.

FIG. 7 shows a computing system related to a vehicle control apparatus or vehicle control method, according to an embodiment of the present disclosure.

Referring to FIG. 7, a computing system 1000 related to a vehicle control apparatus or a vehicle control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the methods or algorithms according to embodiments of the present disclosure may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely illustrative of the technical idea of the present disclosure, and various modifications and modifications may be made by one having ordinary skill in the art without departing from essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Embodiments of the present disclosure provide a vehicle control apparatus and method that may determine a section in which the control command value corresponding to a required acceleration is present, and may selectively use some of devices included in an acceleration device or a deceleration device based on the identified result, thereby performing high-accuracy speed control.

Embodiments of the present disclosure provide a vehicle control apparatus and method that may set an operating state of the host vehicle to an operating state of an acceleration device, may identify a device used immediately before to control the driving speed for the host vehicle, and may determine a device to be used to control the driving speed depending on the type of the identified device.

Embodiments of the present disclosure provide a vehicle control apparatus and method that may selectively use either an acceleration device or a deceleration device based on a value of the control command generated based on normalizing the required acceleration, and may determine whether to further use an additional accelerator (e.g., a second accelerator) included in the acceleration device, based on the control command value while particularly performing, based on a first accelerator, host vehicle control.

Embodiments of the present disclosure provide a more efficient and stable vehicle control method based on performing continuous and adaptive switching control if it is necessary to switch a control mode to a deceleration control mode while acceleration control is performed on the host vehicle, or if the control mode needs to be switched to an acceleration control mode while deceleration control is performed.

Besides, a variety of effects directly or indirectly understood from the present disclosure may be provided.

Hereinabove, although the present disclosure was described with reference to several embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

What is claimed is:

1. A vehicle control apparatus, comprising:
- a sensor device;
- an acceleration device configured to adjust a driving speed of a host vehicle;
- a deceleration device configured to adjust the driving speed of the host vehicle;
- a memory configured to store instructions; and
- a control device operatively connected to the sensor device, the acceleration device, the deceleration device, and the memory,
- wherein the instructions, when executed by the control device, cause the vehicle control apparatus to:
  - set an initial state of the host vehicle indicating an initially operating device to an acceleration device operating state,
  - generate a required acceleration based on a host vehicle acceleration obtained based on the sensor device and at least one of driving information of the host vehicle or driving environment information obtained from the sensor device,
  - determine a current state indicating whether the acceleration device or the deceleration device is to be operated, based on a comparison between a control command value corresponding to the required acceleration and a reference value, and
  - control a device indicated by the current state based on control information of a section to which the control command value belongs among a plurality of preset control command value sections,
- wherein the reference value is determined based on a state indicating a previously operated device of the host vehicle.

2. The vehicle control apparatus of claim 1, wherein the instructions, when executed by the control device, cause the vehicle control apparatus to:

determine whether the control command value is smaller than a first reference value when a previously operated device for adjusting the driving speed is the acceleration device; and set the current state of the host vehicle to the acceleration device operating state, and control the acceleration device based on a greater value among the control command value and a minimum driving amount, when the control command value is greater than or equal to the first reference value.

3. The vehicle control apparatus of claim 1, wherein the instructions, when executed by the control device, cause the vehicle control apparatus to:

determine whether the control command value is smaller than a first reference value when a previously operated device for adjusting the driving speed is the acceleration device; and set the current state of the host vehicle to a deceleration device operating state, and control the deceleration device based on a smaller value among the control command value and a minimum driving amount when the control command value is smaller than the first reference value.

4. The vehicle control apparatus of claim 1, wherein the instructions, when executed by the control device, cause the vehicle control apparatus to:

determine whether the control command value is greater than a second reference value when a previously operated device for adjusting the driving speed is the deceleration device; and set the current state of the host vehicle to a deceleration device operating state, and control the deceleration device based on a smaller value among the control command value and a minimum driving amount when the control command value is smaller than or equal to the second reference value.

5. The vehicle control apparatus of claim 1, wherein the instructions, when executed by the control device, cause the vehicle control apparatus to:

determine whether the control command value is greater than a second reference value when a previously operated device for adjusting the driving speed is the deceleration device; and set the current state of the host vehicle to the acceleration device operating state, and control the acceleration device based on a greater value among the control command value and a minimum driving amount, when the control command value is greater than the second reference value.

6. The vehicle control apparatus of claim 1, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a third section when the control command value is included between a difference between a first maximum driving amount of the first accelerator and a second threshold value and a sum of a minimum driving amount and a third threshold value, set the current state of the host vehicle to a first accelerator operating state based on third control information corresponding to the third section, and control the first accelerator based on the control command value.

7. The vehicle control apparatus of claim 1, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a fourth section when the control command value is included between a sum of a minimum driving amount and a third threshold value and a difference between a minimum driving amount and a fourth threshold value, set the current state of the host vehicle to a first acceleration device operating state based on fourth control information corresponding to the fourth section, when a previously operated device for adjusting the driving speed is the first accelerator, and control the first accelerator based on a greater value of the control command value and the minimum driving amount.

8. A vehicle control apparatus, comprising:

a sensor device;

an acceleration device configured to adjust a driving speed of a host vehicle;

a deceleration device configured to adjust the driving speed of the host vehicle;

a memory configured to store instructions; and a control device operatively connected to the sensor device, the acceleration device, the deceleration device, and the memory, wherein the instructions, when executed by the control device, cause the vehicle control apparatus to:

set an initial state of the host vehicle indicating an initially operating device to an acceleration device operating state, generate a required acceleration based on a host vehicle acceleration obtained from the sensor device and at least one of driving information of the host vehicle or driving environment information obtained from the sensor device, determine a control command value corresponding to the required acceleration, determine, based on a section to which the control command value belongs among a plurality of preset control command value sections, a current state of the host vehicle using at least one of control information or a state indicating a previously operated device, and control an acceleration device or a deceleration device indicated by the current state with a control value determined based on the control command value, wherein the control information is determined based on the section to which the control command value belongs.

9. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

when the control command value is greater than a sum of a first maximum driving amount of the first decelerator and a first threshold value, determine that the control command value is included in a first section, set the current state of the host vehicle to a simultaneous acceleration device operating state based on first control information corresponding to the first section, control the first accelerator based on the first maximum driving amount, and control the second accelerator based on a value from subtracting the first maximum driving amount from the control command value, and when the control command value is included between a sum of a first maximum driving amount of the first accelerator and a first threshold value and a difference between the first maximum driving amount and a second threshold value, determine that the control command value is included in a second section, set the current state of the host vehicle to a simultaneous acceleration device operating state based on second control information corresponding to the second section, when a previously operated device for adjusting the driving speed is the first accelerator and the second accelerator, control the first accelerator based on a smaller value among the first maximum driving amount and the control command value, and control the second accelerator based on a greater value among a minimum driving amount and a difference between the control command value and the first maximum driving amount.

10. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a second section when the control command value is included between a sum of a first maximum driving amount of the first accelerator and a first threshold value and a difference between the first maximum driving amount and a second threshold value, set the current state of the host vehicle to a first acceleration device operating state based on second control information corresponding to the second section, when a previously operated device for adjusting the driving speed is the first accelerator; and control the first accelerator based on a smaller value among the first maximum driving amount and the control command value.

11. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a fourth section when the control command value is included between a sum of a minimum driving amount and a third threshold value and a difference between the minimum driving amount and a fourth threshold value, set the current state of the host vehicle to a first deceleration device operating state based on fourth control information corresponding to the fourth section, when a previously operated device for adjusting the driving speed is the first decelerator, and control the first decelerator based on a smaller value of the control command value and the minimum driving amount.

12. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a fifth section when the control command value is included between a difference between a minimum driving amount and a fourth threshold value and a sum of a second maximum driving amount and a fifth threshold value, set the current state of the host vehicle to a first decelerator operating state based on fifth control information corresponding to the fifth section, and control the first decelerator based on the control command value.

13. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a sixth section when the control command value is included between a sum of a second maximum driving amount of the first decelerator and a fifth threshold value and a difference between the second maximum driving amount and a sixth threshold value, set the current state of the host vehicle to a simultaneous deceleration device operating state based on sixth control information corresponding to the sixth section, when a previously operated device for adjusting the driving speed is the first decelerator and the second decelerator, control the first decelerator based on a greater value of the control command value and the second maximum driving amount, and control the second decelerator based on a smaller value among a minimum driving amount and a sum of the control command value and a first maximum driving amount of the first accelerator.

14. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a sixth section when the control command value is included between a sum of a second maximum driving amount of the first decelerator and a fifth threshold value and a difference between the second maximum driving amount and a sixth threshold value, set the current state of the host vehicle to a first deceleration device operating state based on sixth control information corresponding to the sixth section, when a previously operated device for adjusting the driving speed is the first decelerator, and control the first decelerator based on a greater value of the control command value and the second maximum driving amount.

15. The vehicle control apparatus of claim 8, wherein:

the acceleration device includes a first accelerator and a second accelerator;

the deceleration device includes a first decelerator and a second decelerator; and the instructions, when executed by the control device, cause the vehicle control apparatus to:

determine that the control command value is included in a seventh section when the control command value is smaller than or equal to a difference between a second maximum driving amount of the first decelerator and a sixth threshold value, set the current state of the host vehicle to a simultaneous deceleration device operating state based on seventh control information corresponding to the seventh section, control the first decelerator based on the second maximum driving amount, and control the second decelerator based on a value from summing the control command value and a first maximum driving amount of the first accelerator.

16. A vehicle control method, comprising:

setting, by a control device, an initial state of a host vehicle indicating an initially operating device to an acceleration device operating state;

generating, by the control device, a required acceleration based on a host vehicle acceleration obtained based on a sensor device and at least one of driving information of the host vehicle or driving environment information obtained from the sensor device;

determining, by the control device, a current state indicating whether the acceleration device or a deceleration device is to be operated, based on a comparison between a control command value corresponding to the required acceleration and a reference value; and controlling, by the control device, a device indicated by the current state based on control information of a section to which the control command value belongs among a plurality of preset control command value sections, wherein the reference value is determined based on a state indicating a previously operated device of the host vehicle.

17. The vehicle control method of claim 16, further comprising:

determining, by the control device, whether the control command value is smaller than a first reference value when a previously operated device for adjusting a driving speed of the host vehicle is the acceleration device; and setting, by the control device, the current state of the host vehicle to the acceleration device operating state, and controlling the acceleration device based on a greater value among the control command value and a minimum driving amount, when the control command value is greater than or equal to the first reference value.

18. The vehicle control method of claim 16, further comprising:

determining, by the control device, whether the control command value is smaller than a first reference value when a previously operated device for adjusting a driving speed of the host vehicle is the acceleration device; and setting, by the control device, the current state of the host vehicle to a deceleration device operating state, and controlling the deceleration device based on a smaller value among the control command value and a minimum driving amount when the control command value is smaller than the first reference value.

19. The method of claim 16, further comprising:

determining, by the control device, whether the control command value is greater than a second reference value when a previously operated device for adjusting a driving speed of the host vehicle is the deceleration device; and setting, by the control device, the current state of the host vehicle to a deceleration device operating state, and controlling the deceleration device based on a smaller value among the control command value and a minimum driving amount when the control command value is smaller than or equal to the second reference value.

20. The method of claim 16, further comprising:

determining, by the control device, whether the control command value is greater than a second reference value when a previously operated device for adjusting a driving speed of the host vehicle is the deceleration device; and setting, by the control device, the current state of the host vehicle to the acceleration device operating state, and controlling the acceleration device based on a greater value among the control command value and a minimum driving amount, when the control command value is greater than the second reference value.

* * * * *